United States Patent [19]
Ellingson et al.

[11] Patent Number: 5,975,493
[45] Date of Patent: Nov. 2, 1999

[54] PROCESS FOR CONTROLLING FLOW RATE OF VISCOUS MATERIALS INCLUDING USE OF A NOZZLE WITH CHANGEABLE OPENING

[75] Inventors: William A. Ellingson, Naperville; George A. Forster, Westmont, both of Ill.

[73] Assignee: The University of Chicago, Chicago, Ill.

[21] Appl. No.: 08/926,941

[22] Filed: Sep. 10, 1997

[51] Int. Cl.⁶ ............................................. F16K 3/06
[52] U.S. Cl. .................................................. 251/212
[58] Field of Search ........................... 137/1; 251/212; 138/45

[56] References Cited

U.S. PATENT DOCUMENTS 4,094,492   6/1978   Beeman et al. ........................ 251/212

OTHER PUBLICATIONS

Publication entitled "Rapid Prototyping Is Coming of Age," *Mechanical Engineering*, Jul. 1993, pp. 62–68.
Publication entitled Virtual Prototyping on Personal *Mechanical Engineering*, Jul. 1993, pp. 70–73.
Publication entitled "Making the Leap to Rapid Tool Making," *Mechanical Engineering*, Jul. 1993, pp. 75 and 76.
Publication entitled "Prototyping With Advanced Tools," *Mechanical Engineering*, Jun. 1994, pp. 48, 49, 51–55.

*Primary Examiner*—Kevin Lee
*Attorney, Agent, or Firm*—Emrich & Dithmar

[57] ABSTRACT

Apparatus and a method for controlling the flow rate of viscous materials through a nozzle includes an apertured main body and an apertured end cap coupled together and having an elongated, linear flow channel extending the length thereof. An end of the main body is disposed within the end cap and includes a plurality of elongated slots concentrically disposed about and aligned with the flow channel. A generally flat cam plate having a center aperture is disposed between the main body and end cap and is rotatable about the flow channel. A plurality of flow control vane assemblies are concentrically disposed about the flow channel and are coupled to the cam plate. Each vane assembly includes a vane element disposed adjacent the end of the flow channel. Rotation of the cam plate in a first direction causes a corresponding rotation of each of the vane elements for positioning the individual vane elements over the aperture in the end cap blocking flow through the flow channel, while rotation in an opposite direction removes the vane elements from the aperture and positions them about the flow channel in a nested configuration in the full open position, with a continuous range of vane element positions available between the full open and closed positions.

11 Claims, 7 Drawing Sheets

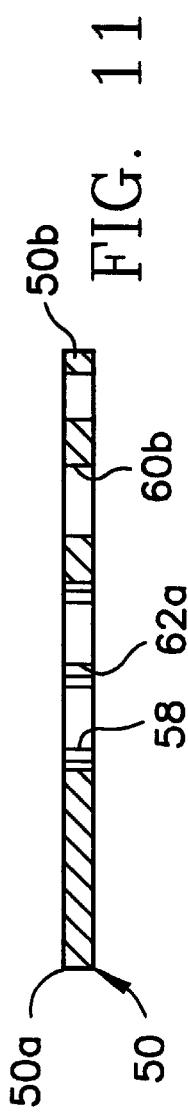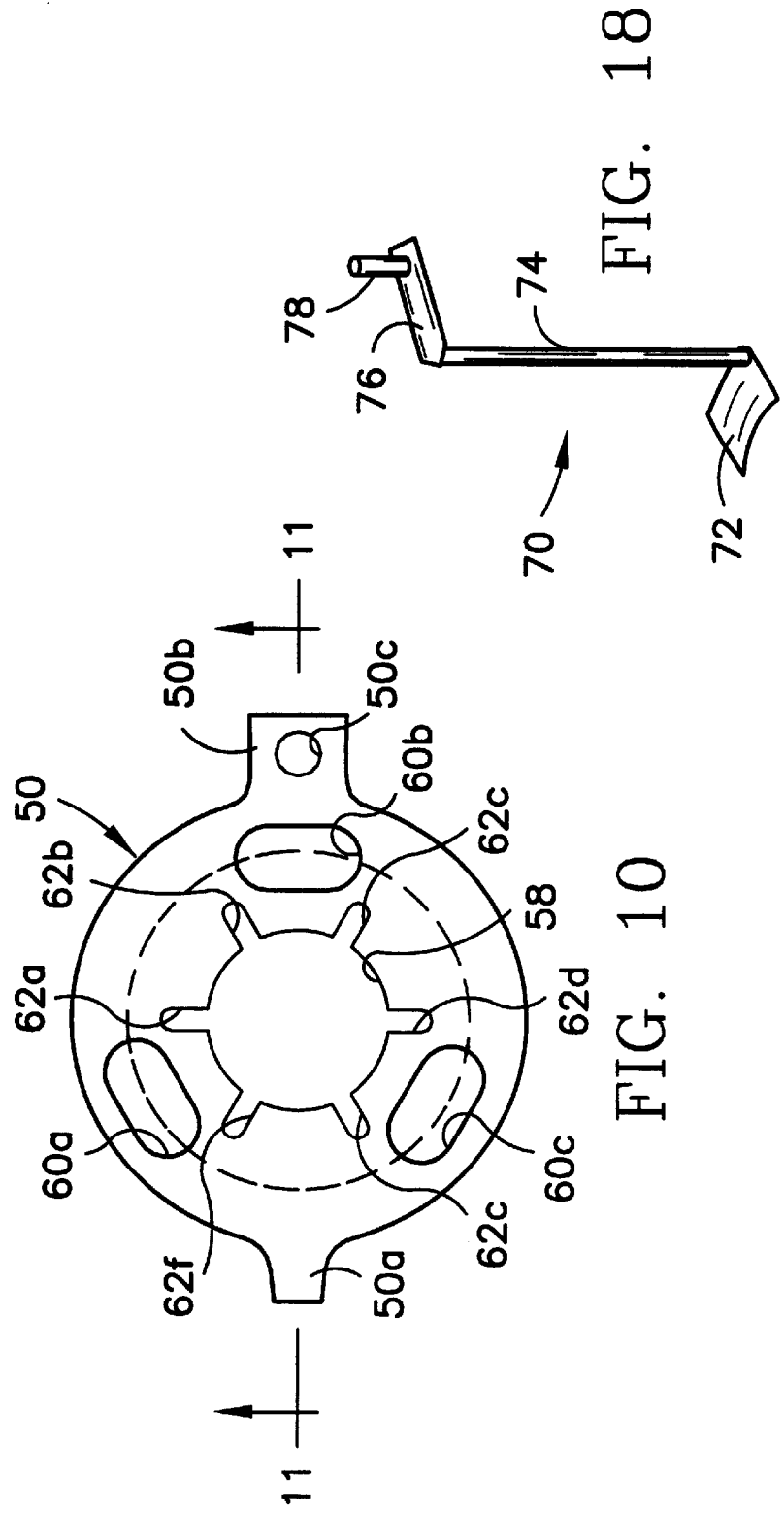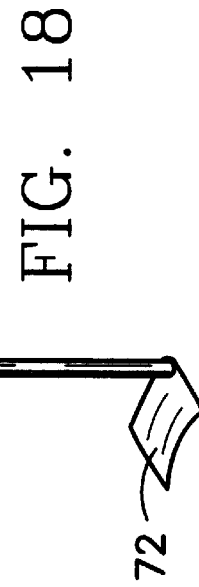

PROCESS FOR CONTROLLING FLOW RATE OF VISCOUS MATERIALS INCLUDING USE OF A NOZZLE WITH CHANGEABLE OPENING

CONTRACTUAL ORIGIN OF THE INVENTION

The United States Government has rights in this invention pursuant to Contract No. W-31-109-ENG-38 between the U.S. Department of Energy and The University of Chicago representing Argonne National Laboratory.

FIELD OF THE INVENTION

This invention relates generally to apparatus and a method for controlling the flow rate of viscous materials through a nozzle and is more particularly directed to apparatus and a method involving the use of a nozzle with a variable flow opening for precisely controlling a changeable flow rate of a viscous material on a continuously variable basis.

BACKGROUND OF THE INVENTION

"Rapid prototyping" is a term commonly used to describe the deposition of small amounts of a material in rows or individual droplets typically in a computer controlled pattern to fabricate an article by the layer-by-layer buildup of the deposited material. Referring to FIG. 1, there is shown in simplified schematic diagram form a typical apparatus 10 used in the fused deposition process for rapid prototyping. The fused deposition apparatus 10 is coupled to a feed mechanism (not shown for simplicity) from which a filament 12 of the material to be deposited is provided. Filament 12 is fed through a pair of oppositely rotating rollers 14a, 14b, through an insulator 16, and into a liquefier 18 which includes a heater (also not shown) for reducing the material to a viscous, flowable form and further includes a discharge nozzle 20. After the material is heated within liquefier 18, it is forced out of the liquefier by conventional means and through nozzle 20 so as to form the fused deposition material 24 which is displaced in the direction of arrow 22 after discharge from the liquefier. Control is usually provided for both the flow mechanism including liquefier 18 and the movement of nozzle 20. During the deposition process, it may occasionally be necessary to change the flow rate and/or change or replace nozzle 20 particularly when more precise control of the deposition such as around the extremities of the article is required. When a nozzle is changed, the deposition process is halted temporarily. This frequently results in voids, cold joints or other defects which substantially reduces the quality and usefulness of the resulting article. Control of the flow rate without interrupting the process would represent a substantial improvement over present approaches because rapid prototype is frequently used to fabricate products of relatively high value with complex shapes and numerous passages or other openings. In addition, items fabricated by rapid prototyping also must typically be provided with highly accurate dimensions. Examples of nozzle openings used in current rapid prototyping equipment are in the range of 0.010–0.075 inch diameters.

Another problem encountered in present rapid prototyping approaches where the viscous material flows as a non-Newtonian fluid is known as "die swell". Die swell is a phenomenon involving the expansion of a fluid emanating from a nozzle or a jet, i.e., the extrudate in an extrusion process, to a diameter significantly larger than the diameter of the orifice of the jet. This phenomenon is shown in the simplified schematic diagrams of FIGS. 2 and 3 and in the photograph of FIG. 4. FIG. 4 shows the die swell of a non-Newtonian fluid as compared with a fluid flowing in accordance with Newtonian principles as shown in FIG. 5, where the fluid does not undergo an expansion as it exits the jet. In FIG. 2, the extrudate, or extruded material, 28 exits nozzle 26 having a diameter $D_1$ and expands to a diameter of $D_0$, where $D_0 > D_1$. The inside nozzle diameter is shown as circular dot 30 in the right hand portion of FIG. 2, while the row diameter of the extrudate 28 is shown by the elliptically shaped dot 32. FIG. 3 is a simplified schematic diagram of one-half of nozzle 26 and extrudate 28 illustrating the axisymmetric jet (nozzle) radius $R_i$ and the corresponding expanded extrudate 28 radius $R_o$. The extrudate 28 flows in the direction of arrows 34 in FIG. 3.

At present, ceramic cores formed by rapid prototyping for investment casting for items such as turbine blades may require as long as six months to complete because of the complexity of design. The cost for producing the ceramic cores using existing prototyping equipment is also significant. Current approaches also lack the dimensional control over the part being fabricated to provide a commercially acceptable article.

The present invention addresses these and other problems encountered in prior art rapid prototyping approaches using viscous materials for fabricating articles of complex shape. The inventive apparatus and method for controlling the flow rate and shape of viscous material includes a mechanical nozzle which is: (1) particularly adapted for computer control; (2) capable of maintaining positive and repeatable position of the material being deposited; (3) capable of maintaining constant internal volume of the viscous material within the nozzle to avoid fluid pressure changes; and (4) capable of quickly changing nozzle diameter, i.e. in less than one second, so as to minimize the impact of material build times.

OBJECTS AND SUMMARY OF THE INVENTION

Accordingly, it is an object of the present invention to provide a continuously variable, precisely controlled flow rate for a viscous material.

It is another object of the present invention to provide apparatus and a method for use in the continuous extrusion of viscous materials such as used in rapid prototyping which substantially reduces defects such as voids and cold joints in the extruded product.

Yet another object of the present invention is to provide precise dimensional control and continuously variable size control for an extruded object.

A further object of the present invention is to provide a nozzle which is adapted for use in the rapid prototyping of objects formed from initially viscous material and is also particularly adapted for computer control.

A still further object of the present invention is to provide for precise control of the flow rate of a viscous material in a continuously variable manner which allows for the extrusion of an article having a complex shape and without defects normally encountered in such articles and procedures such as voids and cold joints.

Another object of the present invention is to provide a nozzle with a continuously variable flow aperture and one or more cavities associated with the nozzle's flow aperture to accommodate slight surges in flow as the aperture changes in size.

This invention contemplates an arrangement for discharging a viscous material in a controlled manner, the arrangement comprising: a main body having a first aperture for receiving the viscous material; an end cap connected to the main body and having a second aperture for receiving the viscous material from the main body and for discharging the viscous material, wherein the first and second apertures form a continuous, elongated, linear flow channel; a plurality of leaf assemblies concentrically disposed about the flow channel, wherein each leaf assembly includes a positioning tab on a first end and a vane element on a second opposed end thereof and further including an elongated linear shaft coupling the first and second ends, and wherein the vane elements are disposed adjacent the flow channel in the end cap; and rotatable positioning means positioned intermediate the main body and the end cap and disposed about the flow channel and coupled to a positioning tab of each of the leaf assemblies for moving each of the vane elements to an open position relative to the flow channel when the positioning means is rotated in a first direction or for moving each of the vane elements to a closed position in the flow channel when rotated in a second opposed direction.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, in which:

FIG. 10 is a plan view of the cam plate used in the continuously variable nozzle of the present invention;

FIG. 11 is a sectional view of the cam plate shown in FIG. 10 taken along sight line 11—11 therein;

FIG. 18 is a perspective view of a leaf assembly used in the continuously variable nozzle of the present invention.

DETAILED DESCRIPTION OF THE PREFERRED EMBODIMENT

Figure 1:
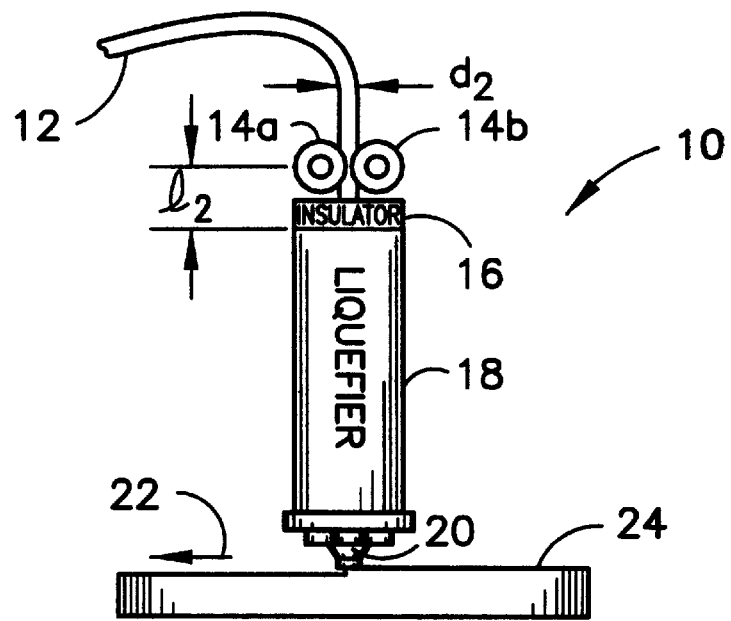
FIG. 1 is a simplified schematic diagram of a typical prior art apparatus used in the fused deposition process for fabricating articles.
Figure 2:
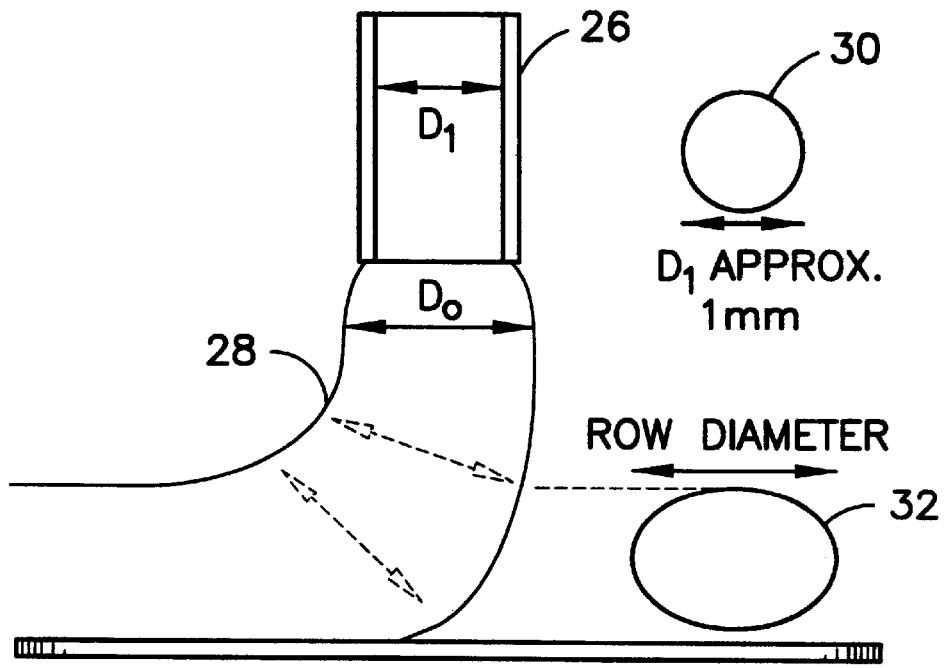
FIG. 2 is a simplified schematic diagram illustrating the phenomenon of die swell for a fluid extruded from a jet, or nozzle, in accordance with non-Newtonian fluid dynamics.
Figure 3:
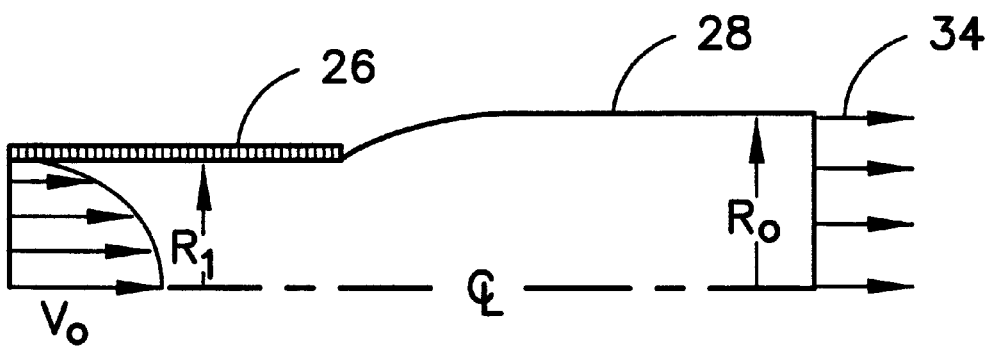
FIG. 3 is a simplified schematic diagram of a portion of a nozzle illustrating non-Newtonian fluid flow from the nozzle.
Figure 4:
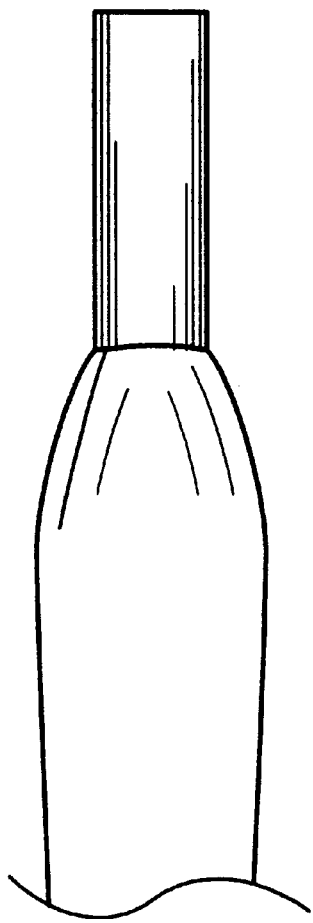
FIGS. 4 and 5 are photographs respectively illustrating non-Newtonian and Newtonian fluid flow from a nozzle.
Figure 5:
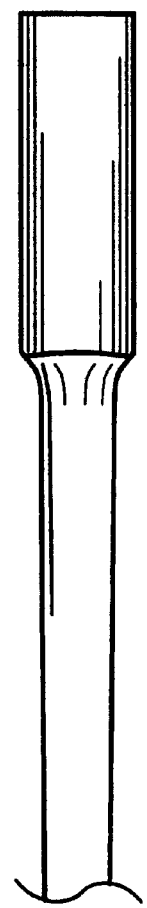
Figure 6:
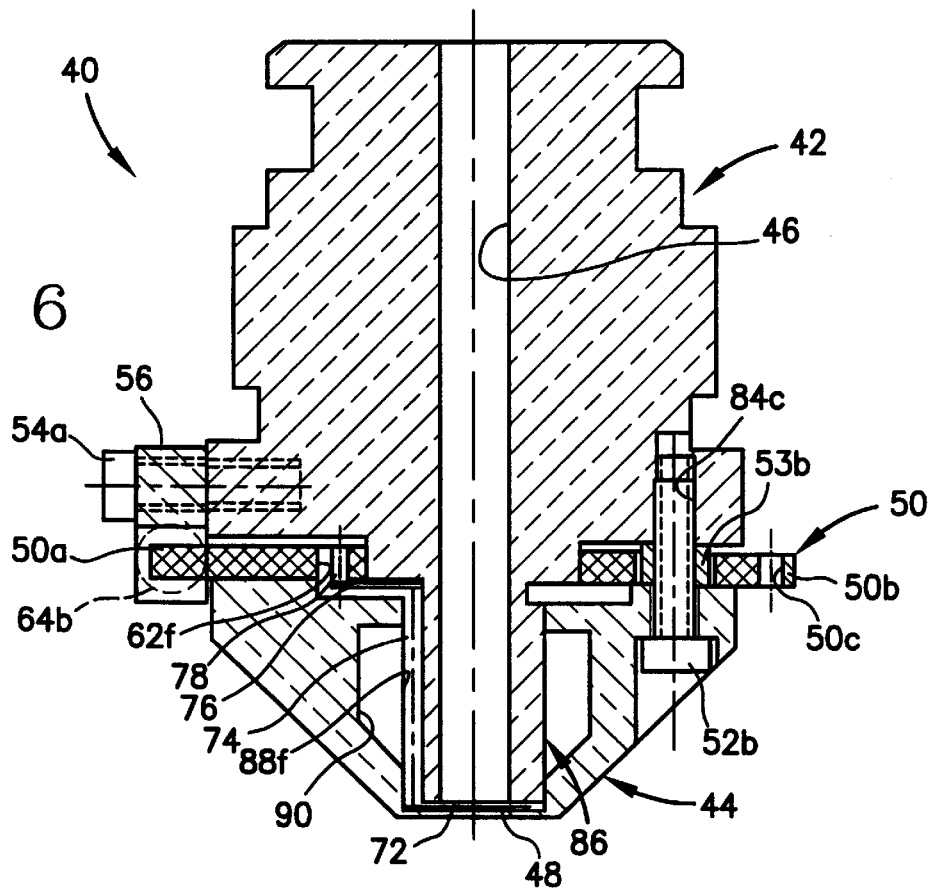
FIG. 6 is a longitudinal sectional view of a continuously variable nozzle in accordance with the principles of the present invention.
Figure 7:
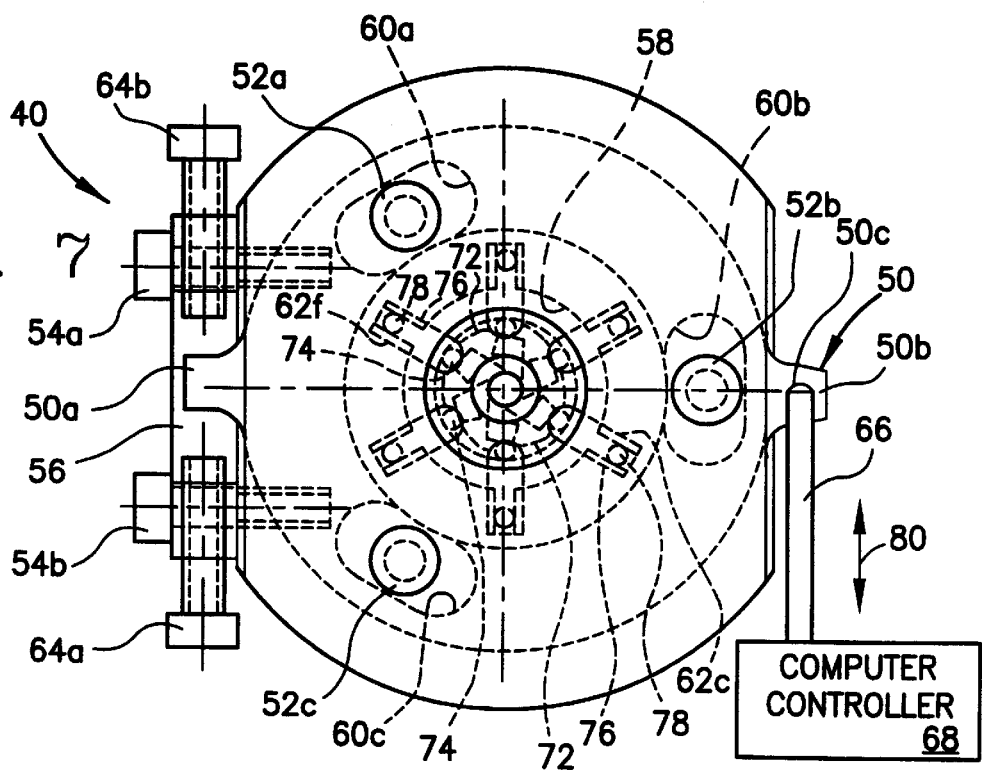
FIG. 7 is an end view shown partially in phantom of the continuously variable nozzle shown in FIG. 6.
Figure 8:
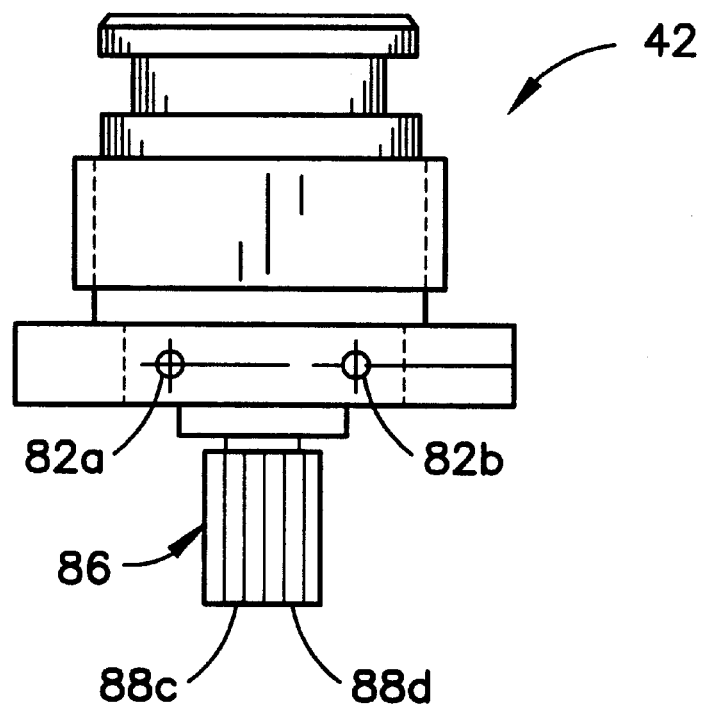
FIG. 8 is a side elevation view of the main body of the inventive continuously variable nozzle.
Figure 9:
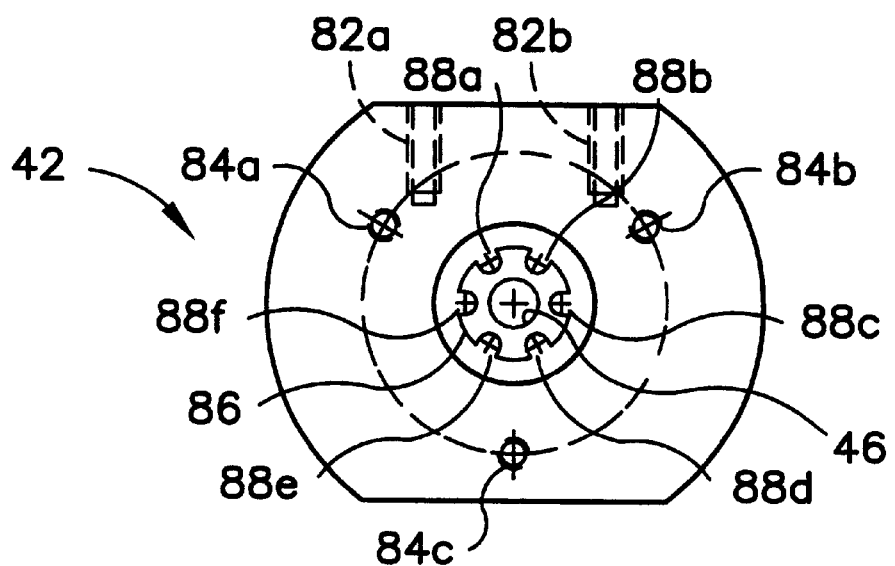
FIG. 9 is a bottom plan view shown partially in phantom of the main body of the inventive continuously variable nozzle.

Referring to FIGS. 6–11 and 18, the structure of a continuously variable nozzle 40 in accordance with the present invention will now be described. FIG. 6 is a longitudinal section view of nozzle 40, while FIG. 7 is a bottom plan view shown partially in phantom of the inventive nozzle. FIGS. 8 and 9 are respectively side elevation and bottom plan views of the main body 42 of the continuously variable nozzle 40. FIG. 10 is a plan view of a cam plate 50 used in the continuously variable nozzle 40, while FIG. 11 is a sectional view of the cam plate shown in FIG. 10 taken along site line 11—11 therein. FIG. 18 is a perspective view of one of six leaf assemblies 70 used in the inventive nozzle 40 for controlling the flow of a viscous material through the nozzle.

The continuously variable nozzle 40 includes the aforementioned main body 42 connected to an end cap 44. Main body 42 includes a first elongated, linear aperture or flow channel 46, while end cap 44 includes a second aperture or flow channel 48. The first and second flow channels 46, 48 are aligned along a common axis to form a continuous, elongated, linear channel through which viscous material may be directed. End cap 44 is attached to the main body 42 by means of first, second and third connecting bolts 52a, 52b, and 52c which are respectively inserted in threaded bolt receiving apertures 84a, 84b and 84c within the main body. Positioned intermediate main body 42 and end cap 44 and concentrically disposed about the first flow channel 46 is a generally planar cam plate 50. Cam plate 50 includes a center aperture 58 concentrically disposed about and engaging a lower portion of the main body 42. Extending radially outwardly from the cam plate's center aperture 58 are a plurality of inner radial slots 62a14 62f equally spaced about the center aperture. Also included in cam plate 50 are three elongated apertures 60a, 60b and 60c concentrically disposed about the cam plate's center aperture 58. The three connecting bolts 52a, 52b and 52c together with three spacers, where the spacer for bolt 52b is shown in FIG. 6 as element 53b, connecting the main body 42 and end cap 44 are each disposed within and extend through a respective one of the elongated apertures 60a, 60b and 60c within cam plate 50. The elongated shape of each of these three apertures 60a, 60b and 60c permit cam plate 50 to be rotationally displaced about flow channel 46 within the main body 42 while the aforementioned spacers allow the connecting bolts 52a, 52b and 52c to securely couple the main body 40 and end cap 44 while allowing freedom of motion to cam plate 50 and to nozzle vanes 72. Disposed on diametrically opposed outer edge portions of cam plate 50 are first and second tabs 50a and 50b. Tab 50b includes an aperture 50c therein which is adapted for coupling to a push-pull rod 66. Push-pull rod 66 is further connected to a computer controller 68 by means of suitable coupling linkage as well as a computer interface (not shown for simplicity) which allows for computer control of the rotational position of cam plate 50 within the continuously variable nozzle 40. It is by means of the computer controller 68 connected to cam plate 50 that the position of each of a plurality of six leaf assemblies 70 controls the flow of viscous material through the continuously variable nozzle 40 as described in detail below. The software for implementing a computer controlled arrangement is currently commercially available. An annular cavity 90 is disposed intermediate a lower end portion 86 of the main body 42 and end cap 44. Annular cavity is further disposed adjacent the outlet end of the flow channel and serves to accommodate slight surges in the flow of the viscous material as the nozzle opening changes. This permits the continuously variable nozzle 40 to be used in rapid prototyping applications where the nozzle opening is rapidly changed on an essentially continuous basis. This prevents voids, cold joints and other defects in the extruded article.

Connected to an outer lateral portion of main body 42 by means of first and second mounting bolts 54a, 54b is a mounting bracket 56. Mounting bracket 56 includes threaded apertures on opposed ends thereof which are adapted for receiving first and second stop bolts 64a and 64b. Rotational displacement of cam plate 50 in a clockwise direction as viewed in FIG. 7 causes the cam plate's first tab 50a to engage the second stop bolt 64b. Stop bolt 64b thus limits clockwise rotation of the cam plate 50 about the first flow channel 46. Similarly, continued counterclockwise rotation of cam plate 50 about the first flow channel 46 will cause the cam plate's first tab 50a to engage the first stop bolt 64a in limiting counterclockwise rotation of the cam plate. The position of the first and second stop bolts 64a, 64b is adjustable within mounting bracket 56 to provide adjustable stops for limiting the rotational displacement of the cam plate 50 in opening and closing the flow channel within the continuously variable nozzle 40 as described in detail below.

The lower end portion 86 of main body 42 includes a plurality of elongated, linear slots 88a–88f disposed about the periphery thereof. Each of the elongated, linear slots 88a–88f is aligned parallel to and disposed concentrically about the first flow channel 46 within the main body 42. Each of the elongated, linear slots 88a–88f is adapted to receive the elongated, linear shaft 74 of a leaf assembly 70 such as shown in the perspective view of FIG. 18. Each leaf assembly 70 further includes a vane 72 disposed on a lower end of shaft 74 and an upper flange 76 disposed on the upper end of the shaft. Extending upwardly from the upper flange 76 is a positioning tab 78. With the shaft 74 of each leaf assembly 70 disposed within a respective elongated, linear slot 88a–88f within the end portion 86 of the main body 42 and aligned parallel with the first flow channel 46, the vanes of the leaf assemblies are disposed about and between the first and second flow channels 46, 48. At the upper end of each leaf assembly 70, an upper flange 76 is disposed between the main body 42 and end cap 44. In addition, each positioning tab 78 extending upwardly from a respective upper flange 76 is disposed within one of the inner radial slots 62a–62f extending outwardly from the center aperture 58 within the cam plate 50. Rotation of cam plate 50 under the influence of the push-pull rod 66 causes a corresponding rotational displacement of each positioning tab 78 of a respective leaf assembly 70 about its elongated linear shaft 74. Displacement of the positioning tab 78 of a leaf assembly 70 causes the leaf assembly to rotate about its elongated, linear shaft 74 which is disposed within one of the elongated, linear slots 88a–88f in the end portion 86 of the main body 42. Rotation of each leaf assembly 70 caused by the rotational displacement of cam plate 50 results in rotational displacement of the vane 72 attached to one end of the leaf assembly's elongated, linear shaft 74. Each vane 72 is generally thin and flat and has a curvilinear shape as it extends from the lower end of a leaf assembly shaft 74 as viewed from either the top or bottom of the leaf assembly.

Figure 12:
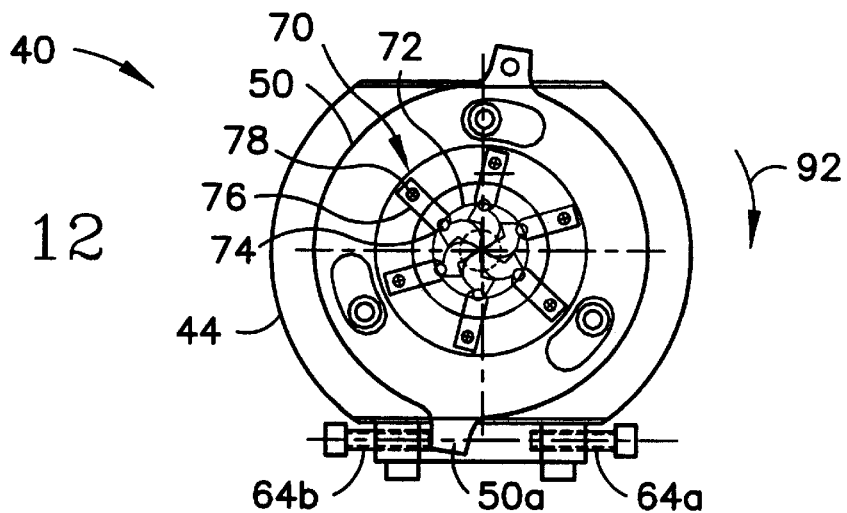
FIGS. 12, 13, and 14 are top plan views of the cam plate and end cap portions of the continuously variable nozzle of the present invention showing the leaf assemblies in the full closed, full open, and partially open positions, respectively, within the nozzle.
Figure 13:
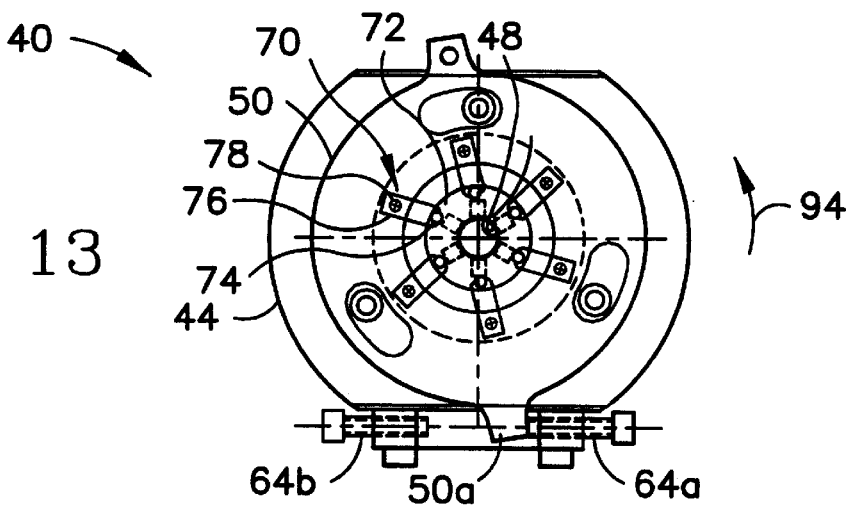
Figure 14:
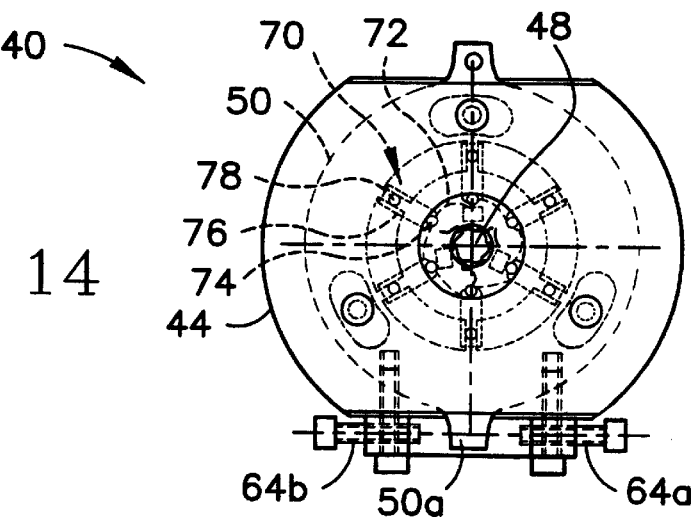
Figure 17:
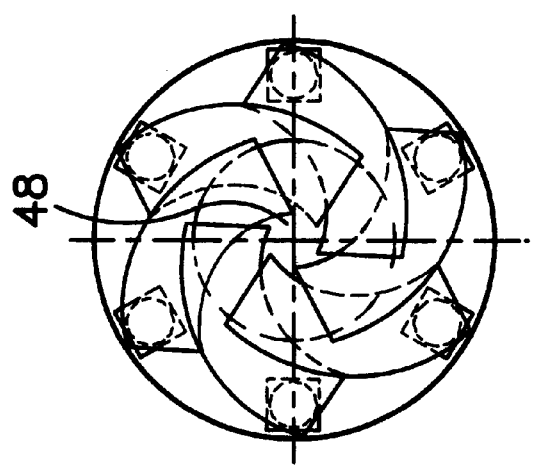
FIGS. 15, 16, and 17 show the leaf elements in the nozzle of the present invention in the full open, partially open and substantially closed positions, respectively, with respect to the nozzle's flow channel.
Figure 16:
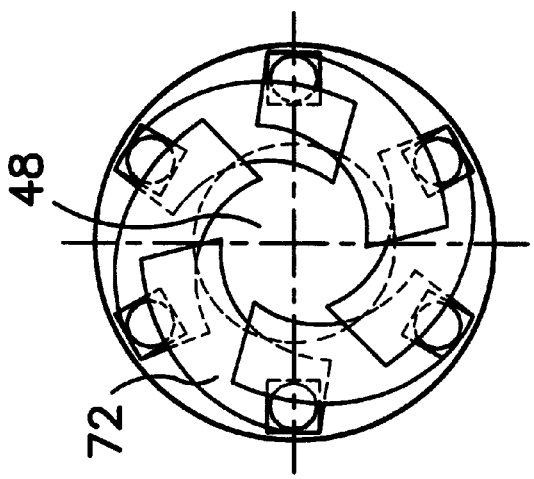
Figure 15:
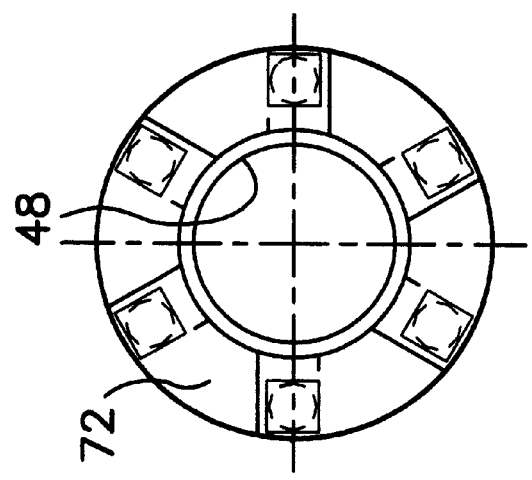

Referring to FIGS. 12, 13 and 14, the manner in which each of the leaf assemblies 70 is rotationally displaced so as to position its associated vane 72 relative to the flow channel in opening and closing the flow channel and controlling the flow of a viscous material will now be described. With respect to the figures, the details of a single leaf assembly 70 are described, it being understood that the other five leaf assemblies have the same size and shape and operate in the same manner. As shown in FIG. 12, cam plate 50 has been fully rotated in a clockwise direction as shown by direction arrow 92 so that its first tab 50a engages the second stop bolt 64b. In this position, the positioning tab 78 of leaf assembly 70 has also been rotated in a clockwise direction about its shaft 74 so that its vane 72 is disposed over the flow channel to close off flow of material through the flow channel. FIG. 12 thus shows the continuously variable nozzle 40 in the full closed position. As shown in FIG. 13, cam plate 50 has been rotated in a counterclockwise direction, or in the direction of arrow 94, causing the positioning tab 78 of leaf assembly 70 to be also rotationally displaced counterclockwise. This causes the leaf assembly's vane 72 to be displaced from a position within the flow channel to a fully retracted position where each vane is disposed in a nested configuration relative to an adjacent vane. In the full counterclockwise position as shown in FIG. 13, each vane 72 of a leaf assembly 70 is disposed either above or below the vane of an adjacent leaf assembly to form a nested configuration of the vanes about the flow channel. FIG. 14 shows the leaf assembly 70 in an intermediate position where the cam plate's first tab 50a is disposed midway between the first and second stop bolts 64a and 64b. In this position, the vane 72 of leaf assembly 70 is disposed partially over the flow channel to provide a partially opened nozzle configuration. This position of the vanes 72 is shown in greater detail in FIG. 16 where the flow channel 48 is shown partially opened. The nested configuration of the vanes 72 is shown in greater detail in FIG. 15, while a substantially closed flow channel 48 is shown in FIG. 17 as each of the leaf assemblies and their associated vanes have been rotated almost to the full clockwise rotational limit.

There has thus been shown apparatus and a method for controlling the flow rate of viscous materials through a nozzle by providing the nozzle with a continuously changeable opening and controlling the change in the size of the opening on an essentially continuous basis. The size of the opening is controlled by the rotational position of a flat cam plate concentrically disposed about the opening, or flow channel. The rotational position of the cam plate is adapted for control by a computer for more precise control of the flow rate. Six interlaced vanes are simultaneously controlled by the cam plate for precisely defining the size of the opening through which the viscous material flows. While the invention is shown as incorporating six (6) interlaced vane assemblies for controlling the size of the opening, the invention is not limited to this number and may employ virtually any number of vane assemblies. A cavity or cavities may be disposed adjacent the flow opening to accommodate slight surges in the flow of the viscous material as the nozzle opening is changed. Continuous, instantaneous control of the nozzle's flow opening can be precisely controlled making the inventive nozzle and method particularly adapted for use in rapid prototyping in the fabrication of expensive, precisely dimensioned components such as ceramic cores for investment casting of turbine blades.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawing is offered by way of illustration only and not as a limitation. The actual scope of the invention is intended to be defined in the following claims when viewed in their proper perspective based on the prior art.

The embodiments of the invention in which an exclusive property or privilege is claimed are defined as follows:

1. An arrangement for discharging a viscous material in a controlled manner, said arrangement comprising:

a main body having a first aperture for receiving the viscous material;

an end cap connected to said main body and having a second aperture for receiving the viscous material from the main body and for discharging the viscous material, wherein said first and second apertures form a continuous, elongated, linear flow channel;

a plurality of leaf assemblies concentrically disposed about said flow channel, wherein each leaf assembly includes a positioning tab on a first end and a vane element on a second opposed end thereof and further including an elongated linear shaft coupling said first and second ends, and wherein said vane elements are disposed adjacent the flow channel in said end cap; and rotatable positioning means positioned intermediate said main body and said end cap and disposed about said flow channel and coupled to a positioning tab of each of said leaf assemblies for moving each of said vane elements to an open position relative to said flow channel when said positioning means is rotated in a first direction or for moving each of said vane elements to a closed position in said flow channel when rotated in a second opposed direction.

2. The arrangement of claim 1 wherein said positioning means includes a generally flat cam plate having a center aperture disposed about said flow channel and rotatable in a direction generally transverse to said flow channel.

3. The arrangement of claim 2 further including a computer controller coupled to said cam plate for rotating said cam plate and positioning said vane elements relative to said flow channel in a desired position.

4. The arrangement of claim 3 wherein said cam plate includes a first tab on a peripheral edge thereof, and wherein said computer controller is connected to said first tab for rotationally displacing said cam plate.

5. The arrangement of claim 4 further comprising stop means for engaging said cam plate and limiting displacement of said cam plate in said first and second directions of rotation, wherein the full open and closed position of said vane elements are determined by the limits of rotation of said cam plate.

6. The arrangement of claim 5 wherein said stop means includes first and second adjustable bolts and said cam plate includes a second tab disposed on a peripheral edge thereof, and wherein said second tab engages said first bolt when said cam plate is rotated in a first direction to define a full open position of said vane elements and said second tab engages said second bolt when said cam plate is rotated in a second opposed direction to define a full closed position of said vane elements, and wherein said full open and closed positions are adjustable.

7. The arrangement of claim 6 further including a mounting bracket for attaching said first and second adjustable bolts to an outer lateral portion of said main body.

8. The arrangement of claim 1 wherein said main body includes a plurality of elongated linear slots aligned parallel with and concentrically disposed about said flow channel for receiving and engaging a linear shaft of one of said leaf assemblies and maintaining the leaf assemblies in position within said main body and said end cap.

9. The arrangement of claim 1 wherein said rotatable positioning means includes a generally flat cam plate, said arrangement further including coupling bolts for connecting said main body and said end cap, wherein said coupling bolts extend through elongated apertures in said cam plate.

10. The arrangement of claim 1 wherein said vane elements are arranged in an overlapping, nested configuration in said end cap when in a full open position and extend into said flow channel when in a closed position.

11. The arrangement of claim 1 further comprising an annular cavity concentrically disposed about and adjacent to said flow channel and further positioned adjacent to the vane elements of said leaf assemblies for receiving viscous material during surges in the flow of the viscous material caused by rapid changes in the position of said vane elements.

* * * * *

UNITED STATES PATENT AND TRADEMARK OFFICE
CERTIFICATE OF CORRECTION

PATENT NO. : 5,975,493
DATED : November 2, 1999
INVENTOR(S) : Ellingson et al.

It is certified that error appears in the above-identified patent and that said Letters Patent is hereby corrected as shown below:

Col. 4, line 34, "14" should be deleted.

Signed and Sealed this

Fifth Day of September, 2000

Attest:

Q. TODD DICKINSON

*Attesting Officer*     *Director of Patents and Trademarks*